United States Patent
Nishio

(10) Patent No.: US 6,665,441 B1
(45) Date of Patent: Dec. 16, 2003

(54) PATTERN MATCHING METHOD AND APPARATUS

(75) Inventor: Yoshiaki Nishio, Osaka (JP)

(73) Assignee: Keyence Corporation, Osaka (JP)

( * ) Notice: Subject to any disclaimer, the term of this patent is extended or adjusted under 35 U.S.C. 154(b) by 588 days.

(21) Appl. No.: 09/605,530

(22) Filed: Jun. 29, 2000

(30) Foreign Application Priority Data

Jan. 31, 2000 (JP) ........................................ 2000-023201

(51) Int. Cl.[7] .............................. G06K 9/62; G06K 9/64; G06K 9/68
(52) U.S. Cl. ...................... 382/209; 382/217; 382/219; 382/220
(58) Field of Search .................................. 352/165, 308, 352/170, 209, 217, 219, 220, 256–258, 283

(56) References Cited

U.S. PATENT DOCUMENTS

| | | | | |
|---|---|---|---|---|
| 4,701,961 A | * | 10/1987 | Hongo ........................ 382/218 |
| 4,866,785 A | * | 9/1989 | Shibano ....................... 382/257 |
| 5,301,248 A | * | 4/1994 | Takanori et al. ............. 382/147 |
| 5,365,596 A | * | 11/1994 | Dante et al. ................. 382/141 |
| 5,640,466 A | * | 6/1997 | Huttenlocher et al. ...... 382/177 |
| 5,937,111 A | * | 8/1999 | Yamada ....................... 382/308 |
| 6,192,160 B1 | * | 2/2001 | Sunwoo et al. ............. 382/257 |
| 6,301,395 B1 | * | 10/2001 | Nishigaki et al. ........... 382/266 |
| 6,388,788 B1 | * | 5/2002 | Harris et al. ................. 359/196 |

FOREIGN PATENT DOCUMENTS

| | | |
|---|---|---|
| EP | 0 434 871 A | 7/1991 |
| EP | 0 785 522 A | 7/1997 |
| EP | 0 926 554 A | 6/1999 |
| JP | 9091378 | 4/1997 |

* cited by examiner

*Primary Examiner*—Amelia M. Au
*Assistant Examiner*—Brian Q Le
(74) *Attorney, Agent, or Firm*—Smith Patent Office

(57) ABSTRACT

A pattern recognition matching processing method and apparatus uses expansion processing with dictionary data as a matching candidate (pattern image). Contraction processing may be performed for the pattern image, and a differential image between the expanded and contracted images can be found. A mask image is prepared based on the differential image, and matching processing of the image containing a character to be recognized with the pattern image is performed with respect to pixels in an area other than the prepared mask image.

16 Claims, 12 Drawing Sheets

FIG. 9 (a)
FIG. 9 (b)
THIN SPOTS
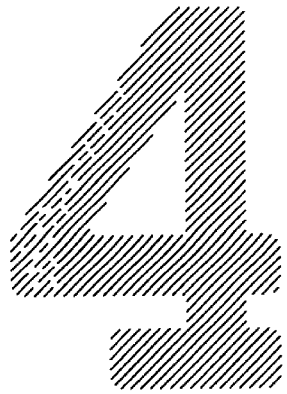 → 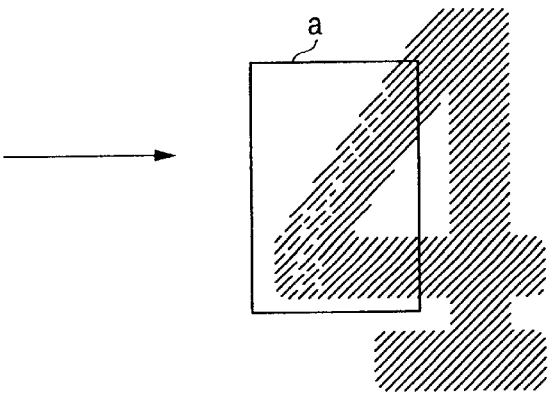
FIG. 9 (c)
BLEEDING
 → 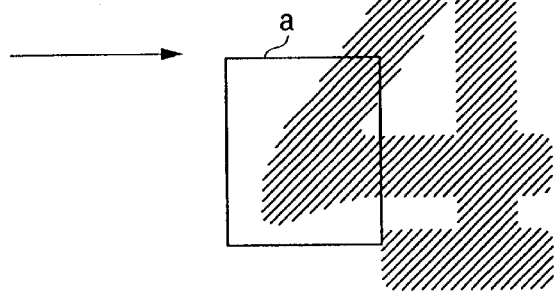

FIG. 10 (a)
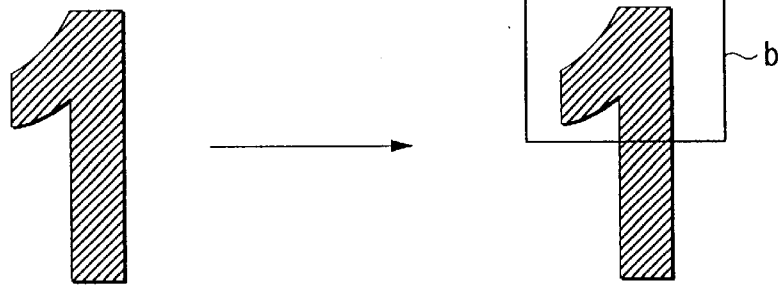
FIG. 10 (b)
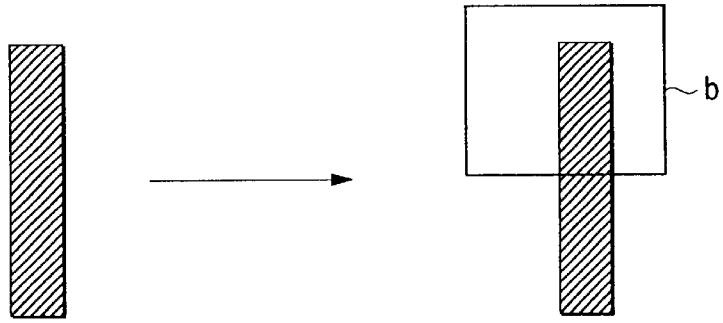
FIG. 11
| 1 | 1 | 1 | 0.5 | 0.5 | 0 | 0 | 0.5 |
|---|---|---|---|---|---|---|---|
| 1 | 1 | 1 | 0.5 | 0 | 0 | 0 | 0.5 |
| 1 | 1 | 1 | 0.5 | 0 | 0 | 0 | 0.5 |
| 1 | 1 | 0.5 | 0.5 | 0 | 0 | 0.5 | 0.5 |
| 1 | 1 | 0.5 | 0 | 0 | 0 | 0.5 | 0.5 |
| 1 | 1 | 0.5 | 0 | 0 | 0 | 0.5 | 1 |
| 1 | 0.5 | 0 | 0 | 0 | 0.5 | 0.5 | 1 |
| 0.5 | 0.5 | 0 | 0 | 0 | 0.5 | 1 | 1 |
| 0 | 0 | 0 | 0 | 0.5 | 0.5 | 1 | 1 |
| 0 | 0 | 0 | 0 | 0.5 | 1 | 1 | 1 |

← BACKGROUND PORTION LIMIT
← CHARACTER PORTION LIMIT

PATTERN MATCHING METHOD AND APPARATUS

BACKGROUND OF THE INVENTION

1. Field of the Invention

This invention relates to a pattern matching method used to read printed material on a food package and to a pattern matching apparatus.

2. Description of the Related Art

In general, on a food package, in addition to the print on the package itself, the freshness date, etc., is printed after the contents are enclosed in the package. To print such a date, various print methods such as marking, branding, etc., are used.

In the food industry, so-called stamp marking using ink rather than punching is often used and is applied to various materials particularly if the surfaces are flat. The brand is applied to packages made of paper, etc., and is a very handy method often used for milk cartons, etc.

Image processing is performed to check if the dates printed on the packages using the print methods are the correct dates at the final stage of manufacturing. Specifically, the printed date is imaged by an image reading device, the date portion is obtained from the imaging result and is binarized, the binarized date portion is matched with previously stored dictionary data as a pattern image. If the matching result matches the date on a timer installed into the matching device, a determination of quality is made.

There is a problem, however, that the line width of the date printed by marking becomes gradually narrow as the amount of ink in the printer decreases or the print pressure lowers, and so-called "thin spots" easily occur, causing an erroneous determination to be made. In contrast, if the ink amount is large or the print pressure is high, so-called "bleeding" easily occurs in the edges of the printed date, also causing an erroneous determination. The line width is also made narrow as a result of the lighting.

A date printed by branding has an uneven print density at the edges and an inner portion and in addition, it is easily affected by lighting because the print density is comparatively low. Therefore, it is hard to obtain the date portion based on brightness distribution, and it is possible that the inner portion rather than the edges of the binarized date portion may be recognized as the background portion, resulting in error.

However, in the print application of the freshness date, etc., as described above, the object is to determine whether the date is correct, and the print quality of the date is not a question. That is, the manufacturer expects that a quality determination may be made if a thin spot, bleeding, print unevenness, thinning, etc., is to such an extent that the consumer can identify the correct date.

SUMMARY OF THE INVENTION

In view of the above problems, it is an object of the invention to provide a pattern matching method unlikely to be affected by thin spots, bleeding, print unevenness, thinning, etc., and to provide a pattern matching apparatus used to execute the method.

According to a first aspect of the invention, a pattern matching method comprises the steps of: performing expansion processing for a preset pattern image used as a matching candidate, thereby preparing a first pattern image; at least one of (a) performing contraction processing for the preset pattern image, thereby preparing a second pattern image, and (b) using the preset pattern image as the second pattern image; finding a differential image between the first and second pattern images; preparing a mask image based on the differential image; and performing matching processing of an image containing a character to be recognized with the pattern image with respect to pixels in an area other than the prepared mask image.

According to a second aspect of the invention, a pattern matching apparatus comprises: first pattern image preparation means for performing expansion processing for a preset pattern image used as a matching candidate, thereby preparing a first pattern image; second pattern image preparation means for at least one of (a) performing contraction processing for the preset pattern image, thereby preparing a second pattern image, and (b) using the preset pattern image as the second pattern image; differential image preparation means for preparing a differential image between the first and second pattern images; mask image preparation means for preparing a mask image based on the differential image prepared by said differential image preparation means; and matching processing means for performing matching processing of an image containing a character to be recognized with the pattern image with respect to pixels in an area other than the mask image prepared by the mask image preparation means.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which:

FIGS. 9(a) to 9(c) are schematic representations describing setting of the scope of mask data;

FIGS. 10(a) and 10(b) are schematic representations describing another setting of the scope of mask data;

FIG. 11 is a schematic representation describing a specific example of weighting of matching processing when the mask processing of the invention is performed;

DETAILED DESCRIPTION OF THE PREFERRED EMBODIMENTS

Figure 1:
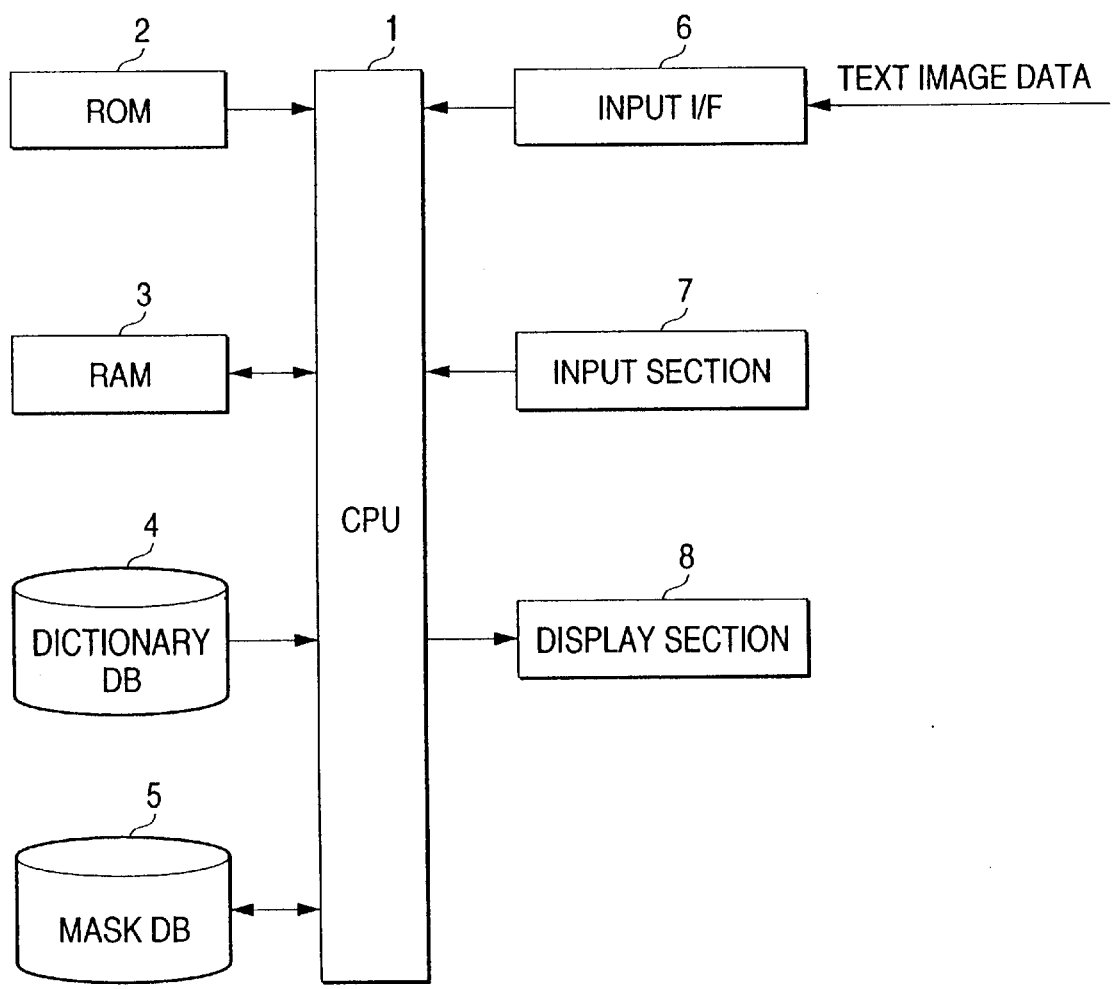
FIG. 1 is a block diagram showing the configuration of a pattern matching apparatus according to the invention.

In the invention, expansion processing is performed for a preset pattern image such as dictionary data used as a matching pattern, thereby preparing a first pattern image. Contraction processing is then performed for the pattern image, thereby preparing a second pattern image. Next, a differential image between the first and second pattern images is found, and a mask image is prepared based on the found differential image. The prepared mask image is set in an area where matching processing is not performed.

Generally, if a print character contains a thin spot, bleeding, print unevenness, thinning, etc., a person can identify the character because he or she sees the flow of the whole character, namely, the whole shape of the center portion of the line width of the character. Based on this viewpoint, the present invention sets a mask image as described above, thereby excluding the edge portion that could cause an error in matching processing. Therefore, pattern matching that is unlikely to be affected by thin spots, bleeding, print unevenness, thinning, etc., in the pixel area in the proximity of the edge portion can be realized.

A character may be thinned during printing or thinned in a scanned image because of lighting. When a character is thinned during printing, the line width of dictionary data is also thinned. If contraction processing is performed to prepare the second pattern image from such dictionary data, there is a danger that the whole character may disappear. Then, the dictionary data is used intact as the second pattern image without performing contraction processing. Thus, expansion processing is performed twice for the dictionary data, to prepare the first pattern. Expansion processing is performed once for the character to be recognized at the time of matching processing, thereby preparing a new character to be recognized.

The number of times the expansion processing is to be performed as described above should be set corresponding to the expansion ratio of each expansion processing. In the invention, the number of times is not limited. The dictionary data as a basis may be expanded or contracted so that a differential image to prepare a mask image can be prepared. However, it is desired that the character to be recognized is expanded or contracted whenever necessary so that the edge portion of the character is placed along the center of the portion corresponding to the line width of the differential image.

The expansion processing or contraction processing ratio as described above can be determined based on the line width of the character to be recognized. This means that if the line width is comparatively thin, the latter method as described above is used without performing contraction processing. In the invention, the ratio may be determined based on not only the line width of the character to be recognized, but also the character size, etc., for example.

The mask area with the mask image prepared as described above need not be applied to the entire character image. That is, an edge portion can be selected to which matching processing is not applied. In doing so, for example, if a thin spot, bleeding, print unevenness, thinning, etc., always occurs in a specific portion of the character image, only that specific portion is excluded from matching processing. In this way pattern matching, which is unlikely to be affected by thin spots, bleeding, print unevenness, thinning, etc., in the pixel area in the proximity of the edge portion can be realized.

In the mask image range, pattern matching would unlikely be affected by, for example, thickening of the line width of a character, a loss of a part of a character, dirt, etc., as well as thin spots, bleeding, print unevenness, thinning, etc. Matching processing that allows for a difference between the font of the dictionary data and that of the character to be recognized is also possible.

In the description made so far, the mask area with the mask image is set in the proximity of the edge portion of the character. In contrast, any area other than the pixel areas corresponding to a differential image can also be used as a mask image. In doing so, the area along the center of the line width of the character portion can be excluded from matching processing, so that matching processing is unlikely to be affected not only by thin spots occurring in the center area, but also by character thickening.

It is also possible to extract the edge of the character to be recognized and then to weight matching processing performed in any area other than the mask area in response to the distance from the edge. In doing so, for example, pattern matching with emphasis put on the pixel areas along the center of the line width of the character can be performed. In this way pattern matching can be brought close to a human being's identification method of identifying the flow of the whole character.

Further, for a character thinned in a scanned image because of lighting unevenness described above, the adverse reading effect can be suppressed by applying preprocessing to the image containing the character to be recognized. That is, the brightness of each pixel in the image containing the character to be recognized is found. Next, a limiter for limiting the brightness of a background portion and a limiter for limiting the brightness of a character portion are set based on the determined brightness of each pixel. Then an image provided by limiting the brightness in the image containing the character to be recognized according to the two setup limiters is used as a new image containing the character to be recognized.

According to the above-described method, the effect of print unevenness containing thin spots, bleeding, etc., caused by a change in the ink amount or print pressure of a printer can also be decreased.

The text or characters applied in the present invention can contain symbols and digits such as a date. In the invention, the methods of printing the character to be recognized are not limited to branding, marking, etc., and other methods using an ink jet, laser, etc., may be adopted. Further, the application range of the invention is not limited to food packages.

Referring now to the accompanying drawings, preferred embodiments of the invention are discussed. FIG. 1 is a block diagram showing the configuration of a pattern matching apparatus according to the invention. In the figure, CPU (central processing unit) 1 controls each section of the pattern matching apparatus according to the invention. Connected to the CPU 1 are ROM (read-only memory) 2, RAM (random access memory) 3, a dictionary database (dictionary DB) 4, a mask database (mask DB) 5, an input I/F (interface) 6, an input section 7, and a display section 8.

The ROM 2 previously stores various computer programs required for the operation of the CPU 1. The RAM 3 stores temporary data, etc., occurring during the computer program execution of the CPU 1 and also stores various pieces of setup information useful for pattern matching of the invention. The RAM 3 also functions as an image memory.

The dictionary database 4 stores dictionary data as pattern images to be matched. The mask database 5 stores mask data prepared based on the dictionary data. The mask data may be stored in the same database as the dictionary data in the form of data appended to the dictionary data on which the mask data is based.

The input I/F 6 is an interface for reading text image data to be recognized from the outside and is connected to an image pickup device, for example. The text image data will be described as a text image containing a background portion.

The input section 7 comprises input units of a keyboard, a mouse, etc., for inputting various pieces of setup information such as described above. The display section 8 displays the operation state of the CPU 1, the processing result, etc.

The pattern matching apparatus according to the invention has the above described hardware configuration and comprises a mask processing function of preparing mask data based on the dictionary data stored in the dictionary database 4. The mask processing performs pattern matching with text image data read from the outside only in any area other than the pixel area corresponding to the prepared mask area. This function is mainly executed by the CPU 1 and thus will be discussed below with reference to a flowchart.

In the embodiment, the mask data is prepared and is registered in the mask database 5 before pattern matching processing described below is performed. However, in the invention, when matching processing is performed, mask data may be prepared in sequence for the target dictionary data.

Figure 2:
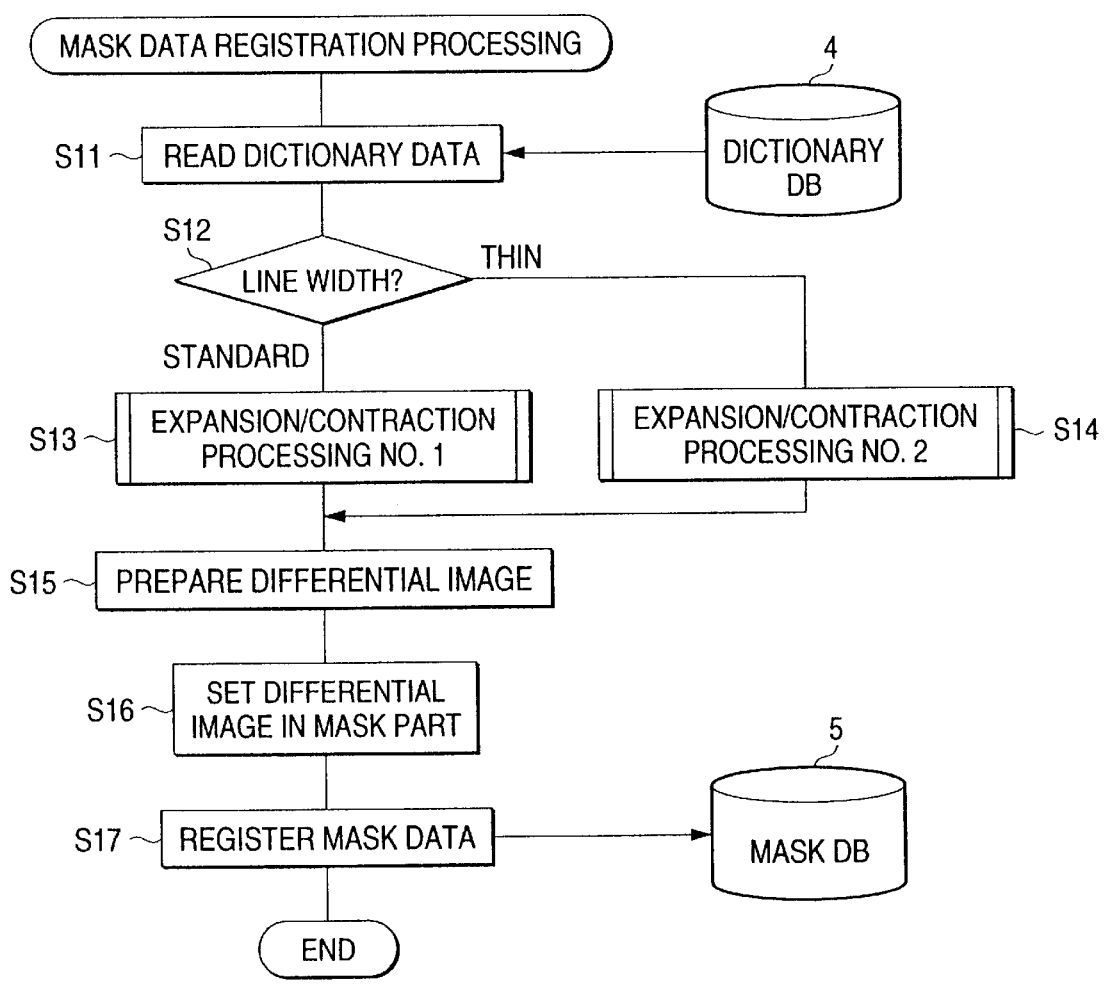
FIG. 2 is a flowchart showing the processing of a CPU of the pattern matching apparatus according to the invention accompanying mask data registration processing.

FIG. 2 is a flowchart showing the processing contents of the CPU 1 of the pattern matching apparatus according to the invention accompanying mask data registration processing. The CPU 1 first reads any dictionary data from the dictionary database 4 at step S11. Then CPU 1 checks the line width of the read dictionary data character at step S12. This check is, for example, based on the ratio of the text part area (the number of pixels) in the dictionary data of the rectangle containing the character to the background portion and the character type (containing the attributes of font, etc.).

Next, if the line width is a predetermined standard line width, the CPU 1 executes a subroutine of expansion/contraction processing No. 1 described later at step S13. If the line width is narrower than the standard line width, the CPU 1 executes a subroutine of expansion/contraction processing No. 2 described later at step S14. In each expansion/contraction processing subroutine, expansion processing, contraction processing, and the like are performed for the dictionary data to prepare two types of images. The images provided by binarizing the two types of images are stored in RAM 3. If the character line width is heavy, a serious problem does not occur and processing is convenient. Thus processing to be performed if the character line width is heavy will not be discussed for simplicity of the description in the embodiment.

Following step S13 or S14, the CPU 1 prepares a differential image between the two binarized images prepared in either expansion/contraction processing subroutine and stored in RAM 3 at step S15. Then the CPU 1 sets the pixel area of the prepared differential image as a mask part at step S16.

The CPU 1 registers the setup information of the mask part in the mask database 5 as mask data at step S17. The processing is repeated in sequence for the necessary pieces of the dictionary data stored in the dictionary database 4.

Figure 3:
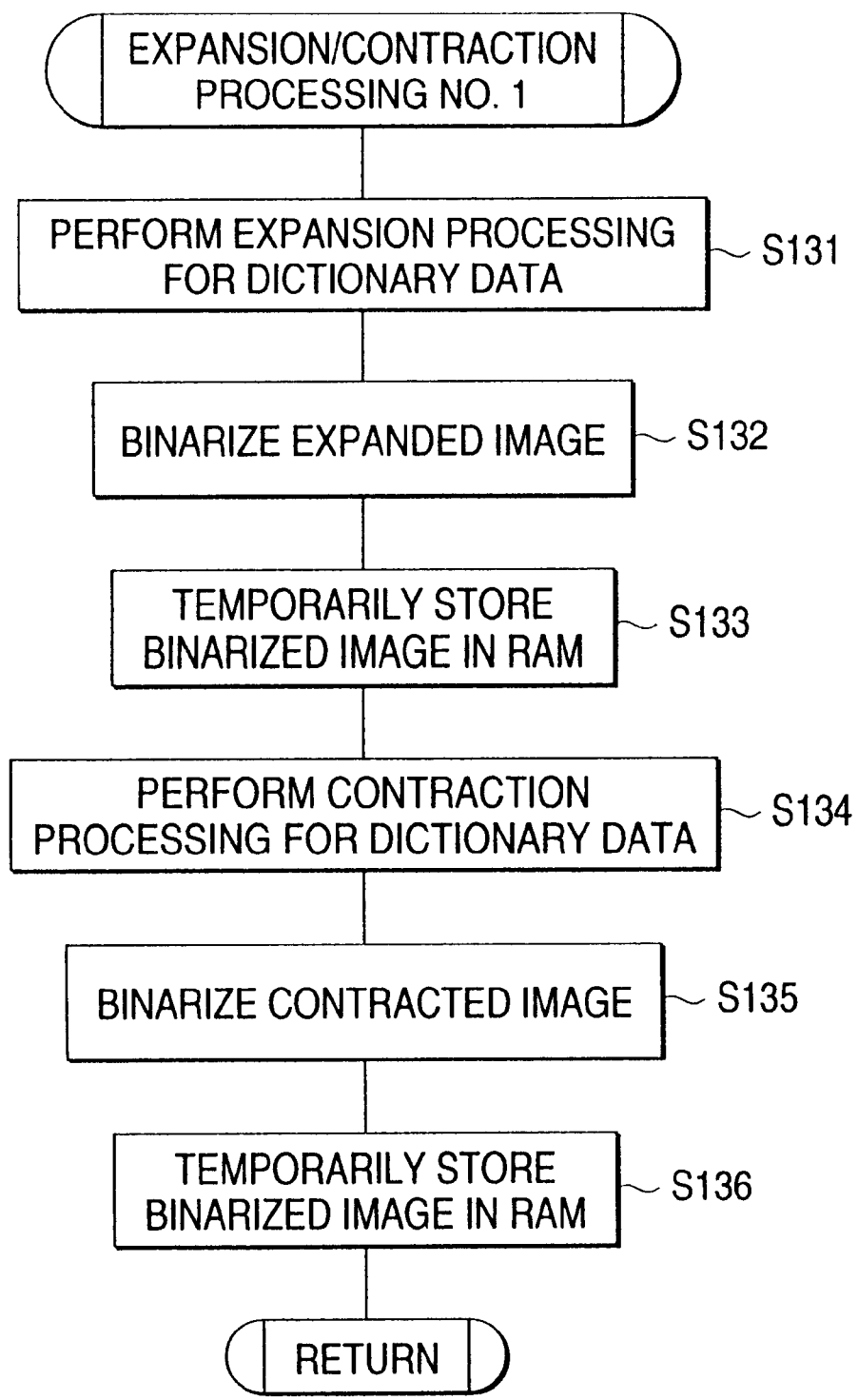
FIG. 3 is a flowchart showing a subroutine of expansion/contraction processing No. 1.

FIG. 3 is a flowchart showing the subroutine of expansion/contraction processing No. 1. The subroutine is executed when the line width of dictionary data is standard. In the subroutine, the CPU 1 first performs expansion processing for the dictionary data read at step S11 at step S131, binarizes the expanded image at step S132, and temporarily stores the binarized image in RAM 3 at step S133.

The CPU 1 performs contraction processing for the dictionary data read at step S11 at step S134, binarizes the contracted image at step S135, and temporarily stores the binarized image in RAM 3 at step S136.

Figure 4:
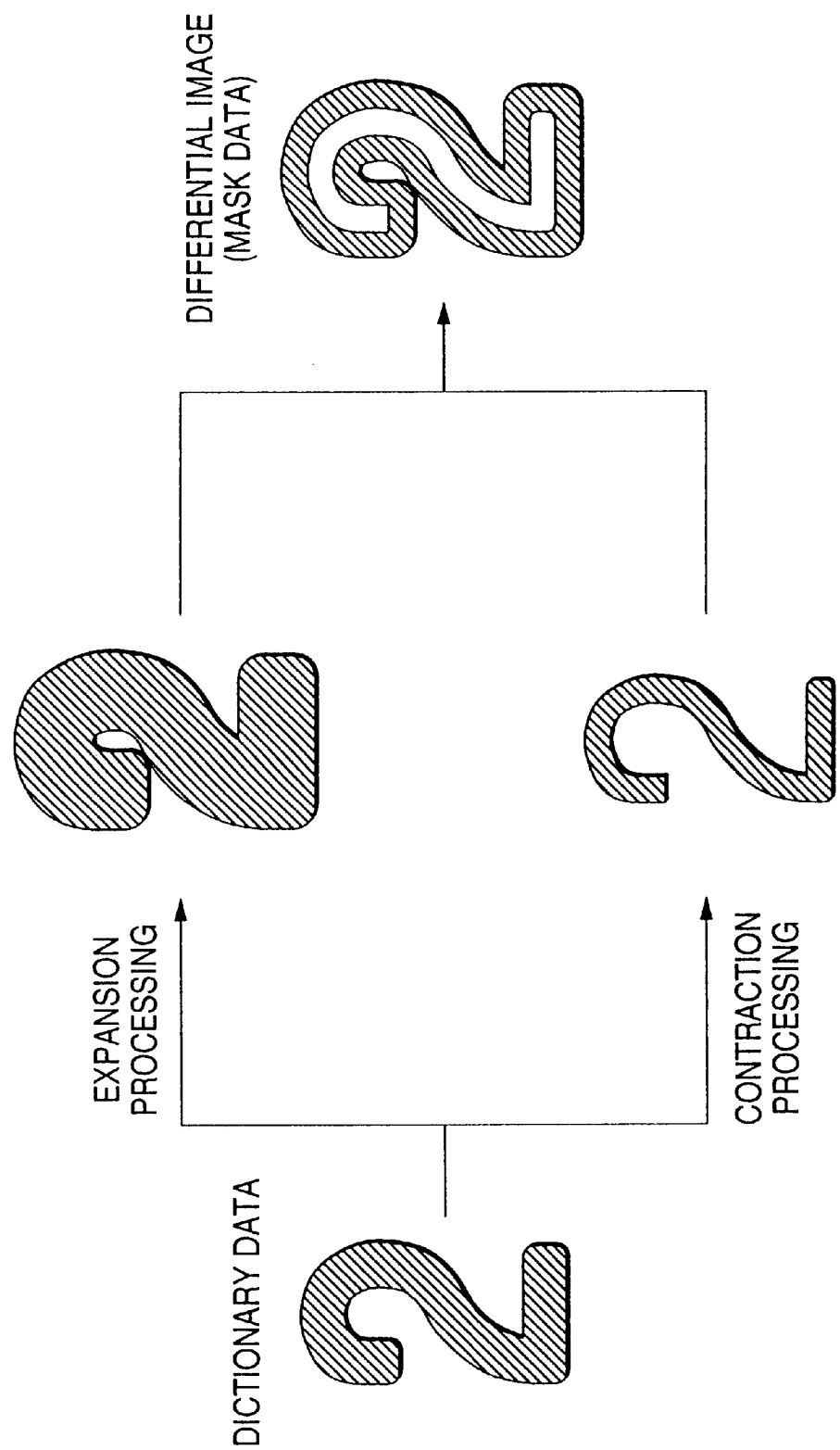
FIG. 4 is a schematic diagram showing a specific example of image data generated in the preparation process of a differential image (mask data) from dictionary data when the subroutine of expansion/contraction processing No. 1 is executed.

FIG. 4 is a schematic diagram showing a specific example of image data generated in the preparation process of the differential image (mask data) from the dictionary data when the subroutine of expansion/contraction processing No. 1 is executed. As shown in FIG. 4, expansion processing and contraction processing are performed for one piece of dictionary data to prepare two types of images, namely, an expanded image and a contracted image. A differential image between the two types of prepared images is prepared like an edge image.

Figure 5:
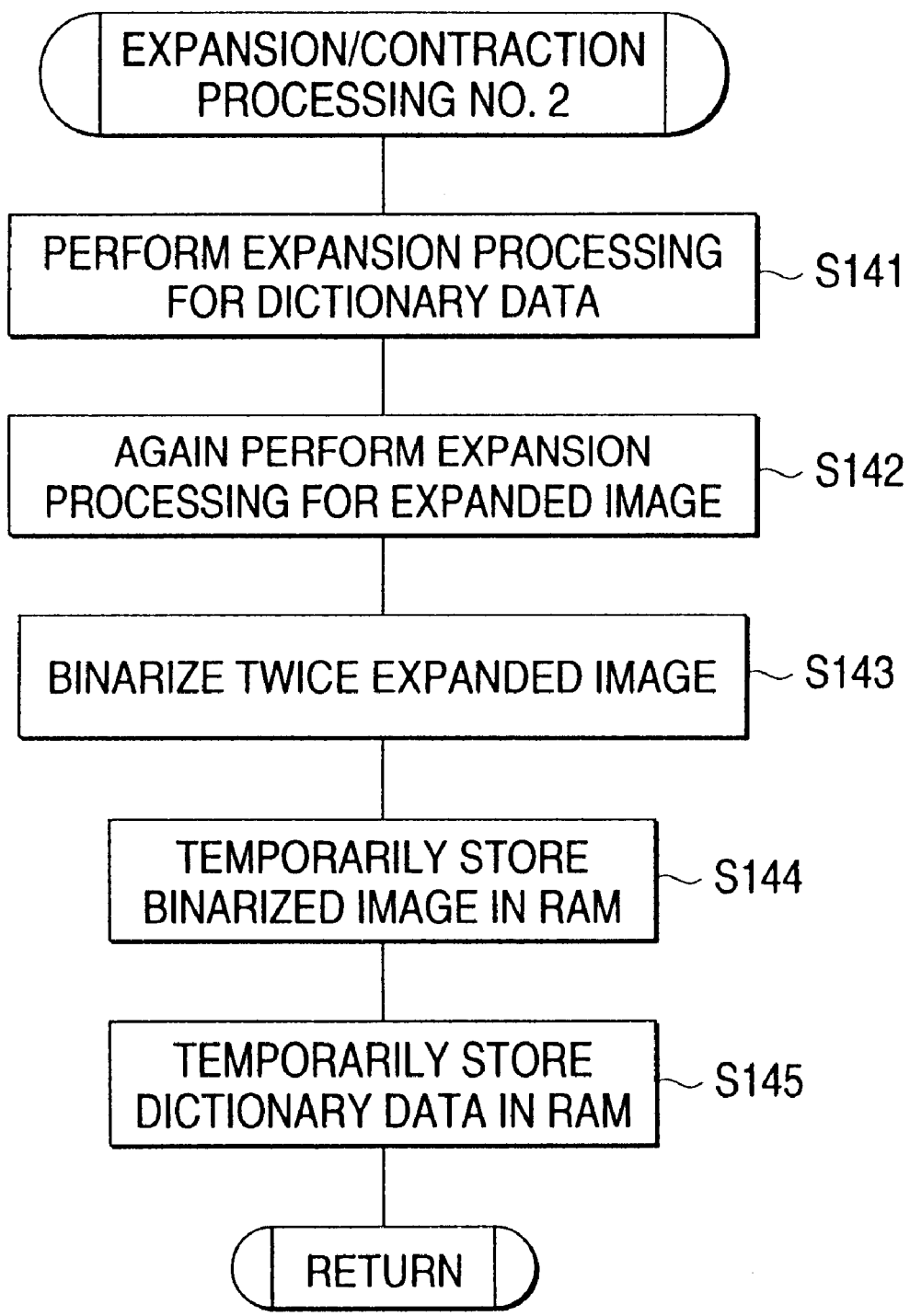
FIG. 5 is a flowchart showing a subroutine of expansion/contraction processing No. 2.

FIG. 5 is a flowchart showing the subroutine of expansion/contraction processing No.2. The subroutine is executed when the line width of dictionary data is narrower than the standard. In the subroutine, the CPU 1 first performs expansion processing for the dictionary data read at step S11 at step S141 and again performs expansion processing for the expanded image at step S142.

The CPU 1 binarizes the twice expanded image at step S143 and temporarily stores the binarized image in RAM 3 at step S144. The CPU 1 temporarily stores the dictionary data read at step S11 in RAM 3 as the dictionary data at step S145.

Thus, in the subroutine, contraction processing is not performed for dictionary data having a line width narrower than the standard line width, so that accidental disappearance of the dictionary data character can be avoided. The dictionary data is used as one image intact without undergoing contraction processing, and the other image is provided by twice executing expansion processing.

In the subroutine of expansion/contraction processing No. 2 in the embodiment, the other image is provided by twice executing expansion processing because the same ratio as the expansion processing ratio used in the subroutine of expansion/contraction processing No. 1 described above is used. For example, if the expansion ratio of one expansion processing is twice the current ratio, it is possible to perform the expansion processing only once.

Figure 6:
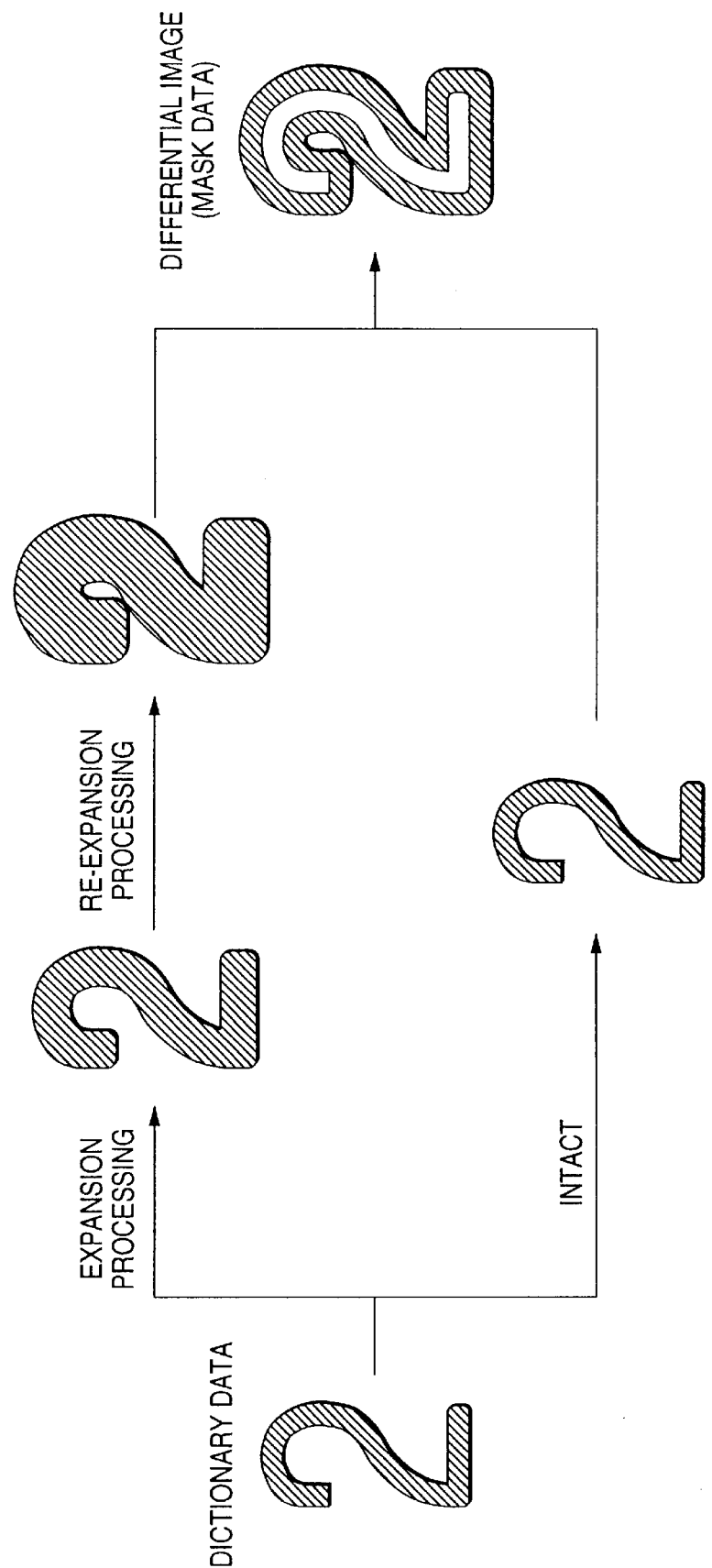
FIG. 6 is a schematic diagram showing a specific example of image data generated in the preparation process of a differential image (mask data) from dictionary data when the subroutine of expansion/contraction processing No. 2 is executed.

FIG. 6 is a schematic diagram showing a specific example of image data generated in the preparation process of the differential image (mask data) from the dictionary data when the subroutine of expansion/contraction processing No. 2 is executed. As shown in FIG. 6, while expansion processing is performed twice (expansion processing and re-expansion processing) for one dictionary data piece to prepare an image, the dictionary data is used intact as another image. A differential image between the two types of images is prepared like an edge image similar to that shown in FIG. 4.

Figure 7:
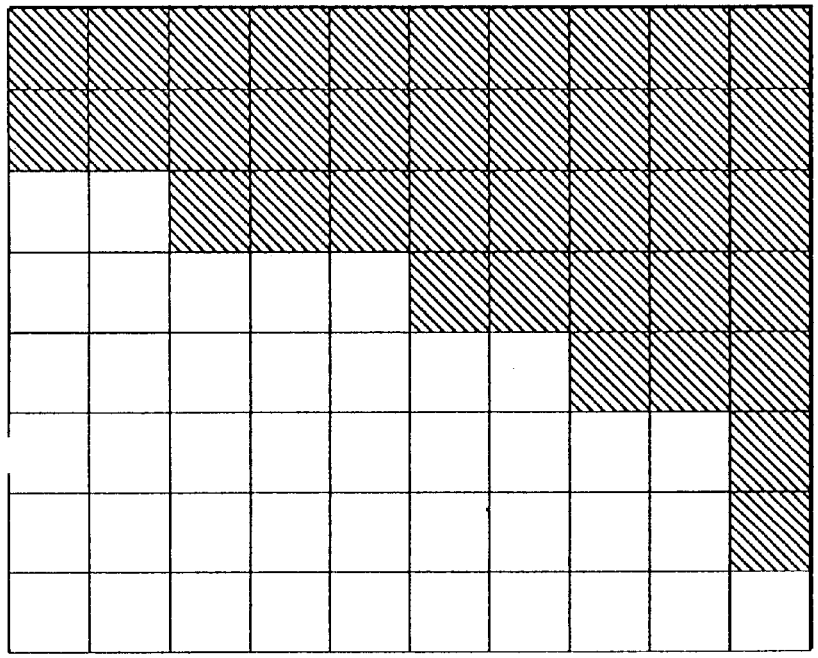
FIGS. 7(a) and 7(b) are schematic diagrams showing specific examples of a part of dictionary data or ideal text image data and mask data corresponding thereto.

FIGS. 7(a) and 7(b) are schematic diagrams showing specific examples of a part of dictionary data or ideal text image data and the mask data corresponding thereto. In FIG.

7(a), the portion corresponding to each square indicates a pixel, the hatched area indicates a text (character) portion, and the white area indicates a background portion. The ideal text image data becomes roughly the same as its master dictionary data.

FIG. 7(b) shows the mask data corresponding to the data in FIG. 7(a); the area denoted by "0" is a mask part, and the area denoted by "1" is a non-mask part. Therefore, in the embodiment, the CPU 1 checks whether each pixel is "0" or "1", and performs matching processing only in the "1" pixel areas.

That is, in the example in FIG. 7(b), matching processing is not performed in the pixel areas in the proximity of the edges of the character portion. Therefore such matching processing reasonably allows matching to be accomplished even if there are thin spots, bleeding, print unevenness, character thinning, thickening, etc.

Figure 8:
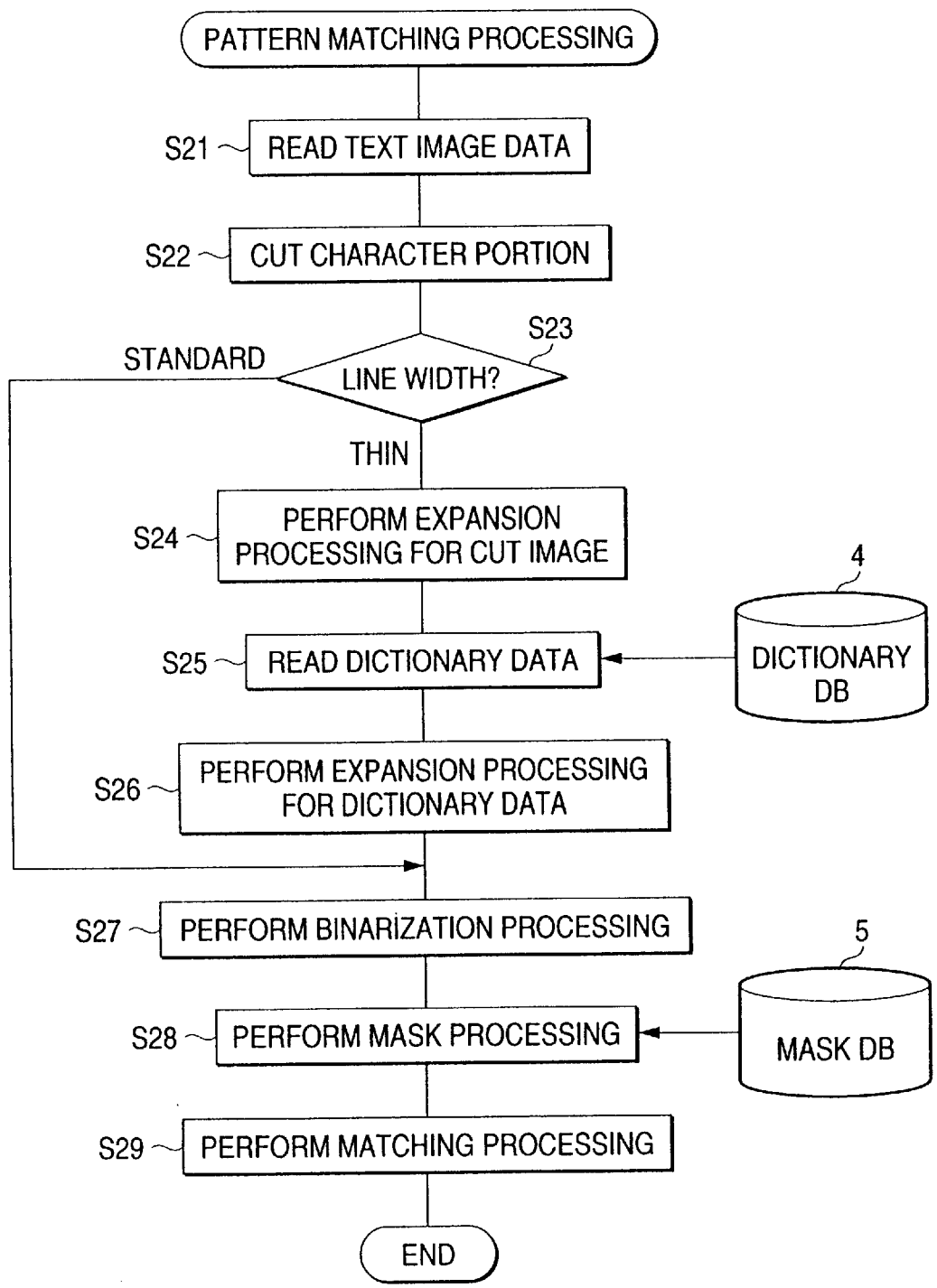
FIG. 8 is a flowchart showing the processing of the CPU of the pattern matching apparatus according to the invention accompanying pattern matching processing.

Next, pattern matching processing using a mask image as described above will be discussed with reference to FIG. 8. FIG. 8 is a flowchart showing the processing contents of the CPU 1 of the pattern matching apparatus according to the invention. The CPU 1 first reads text image data through the input I/F 6 at step S21. From the read text image data, the CPU 1 cuts a rectangular area containing the character portion contained in the text image data at step S22. If the text image data read through the input I/F 6 provides an already cut image from the image data, the step is not required.

The CPU 1 checks the line width of the character contained in the cut image by a method, similar to that described in step S12, in step S23. If the line width is narrower than the predetermined standard line width, the CPU 1 performs expansion processing for the cut image at step S24. The CPU 1 reads the dictionary data used as a matching candidate from the dictionary database 4 at step S25 and also performs expansion processing for the dictionary data at step S26.

Following step S26 or if the line width is the standard line width at step S23, the CPU 1 binarizes the cut and expanded image at step S27, reads the mask data corresponding to the dictionary data from the mask database 5, and performs mask processing for the binarized image at step S28. The CPU 1 matches the binarized image undergoing the mask processing with the dictionary data at step S29. To perform such matching processing for each corresponding dictionary data piece, the process starting at step S25 is repeated. The character corresponding to the match dictionary data is assumed to be the determination character, and the determination result is displayed on the display section 8, for example.

FIGS. 9(a) to 9(c) are schematic representations to describe setting of the scope of mask data. Here, for example, text image data is the digit "4" in one font. The text image data is ideally like that as shown in FIG. 9(a). However, thin spots as shown in FIG. 9(b) may occur because of a decrease in the ink amount in marking, lowering of the print pressure, etc., as described above. For example, if such thin spots often occur only in a constant area in the text image data, mask processing as described above is applied only to such an area, and normal matching processing is performed in the other areas.

Bleeding as shown in FIG. 9(c) may occur because of a large amount of ink in marking, high print pressure, etc., as described above. For example, if such bleeding often occurs only in a constant area in the text image data, mask processing as described above is applied only to such an area, and normal matching processing is performed in other areas.

In doing so, mask processing is not performed for the entire character contained in the text image data. Thus it is possible to perform stricter matching processing. Such application of limited mask data can be easily carried out by setting, for example, a rectangular area "a" through the input section 7 and storing the rectangular area "a" in the database in correspondence with the dictionary data, mask data, etc., as shown in FIGS. 9(b) and 9(c).

FIGS. 10(a) and 10(b) are schematic representations to describe another setting of the scope of the mask data. For example, comparatively similar characters such as "1" and "I" may be present in one font. If such similar characters are present, for example, when bleeding as described above occurs, it may be impossible to distinguish the characters from each other. This becomes conspicuous particularly if mask processing as described above is applied to the entire character. Then, an area "b" like the area "a" described above is set for the different shape part between the characters. The area "b" is set in the top of each character in the example in FIGS. 10(a) and 10(b). Mask processing is not performed in the range of the area "b" contrary to the area "a".

FIG. 11 is a schematic representation describing a specific example of weighting matching processing when the mask processing of the invention is performed. In the example shown in FIG. 7(b), pixel areas other than mask data are set to all "1", and matching processing is performed in a similar manner. However, the invention is not limited to this arrangement. It is also possible to perform matching processing for the pixel areas other than mask data from the viewpoints of improving the characteristics of the character, the brightness of the character part, the identification of the character, etc.

As a specific example, matching processing is performed for the pixel areas other than mask data in response to the distance from the character edge, i.e., based on the distance from the pixel of the edge of the pixel area as the mask data.

For example, the pixel area corresponding to the mask data is set to "0", the pixel area close to that pixel area is set to "0.5", and the outer pixel area is set to "1". As actual processing corresponding to the example in FIG. 7(b), in FIG. 11, the total number of pixels with weight "1" is 25, that of pixels with weight "0.5" is 25, and that of pixels with weight "0" is 30. Therefore, the whole weight value in the matching processing becomes a value of 37.5 resulting from multiplying each weight value by the number of pixels corresponding thereto and adding all values together.

In evaluation of the matching processing, the whole weight value 37.5 is used as a setup value and is compared with the value based on the actual imaged character (brightness value). Here, the pixel areas other than the mask data are weighted as "0.5" and "1", but three or more types of weight values rather than the two types of weight values may be used.

In this case, the matching processing is weighted in response to the distance from the character edge. However, the weighting is not set based on a constant distance from the character edge in the feature portion required for identifying each character and can also be set appropriately so as to easily evaluate the feature portion. In other words, in the pixel areas other than the mask data, it is also desirable to set the weight value in response to peculiar print variations, etc., caused by a disturbance, print accuracy, and the character shape. In addition, the user may wish to set more than one weight value in the area.

Figure 12:
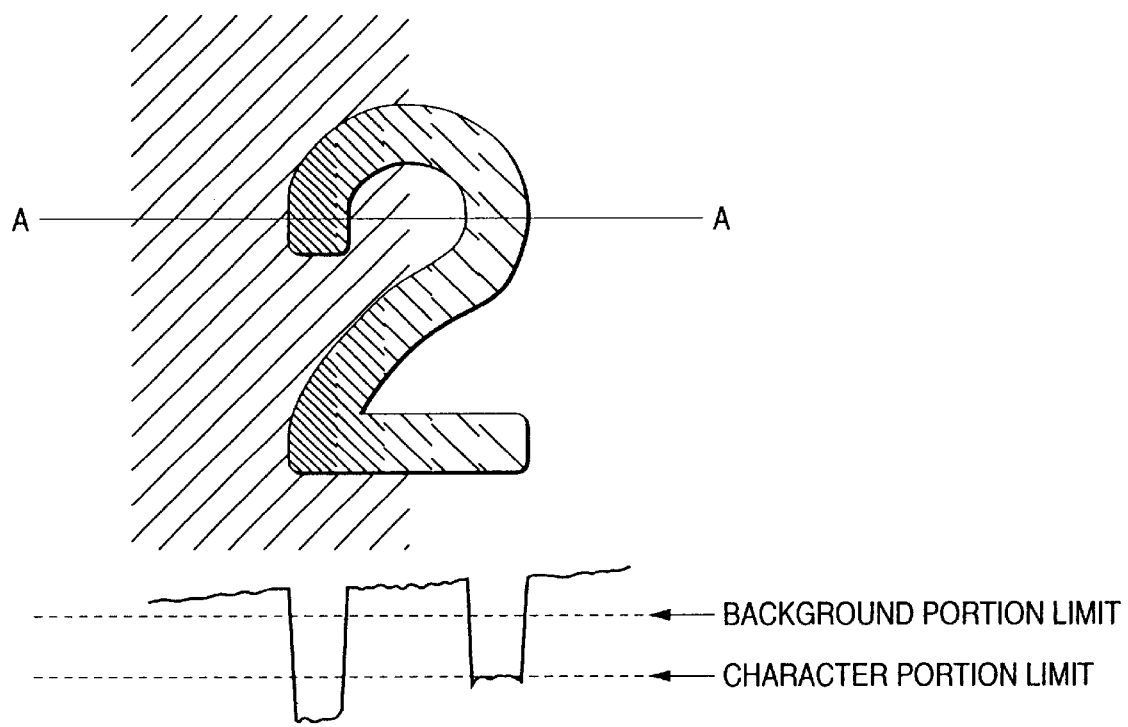
FIGS. 12(a) and 12(b) are schematic representations describing preprocessing applied when lighting unevenness affects text image data.
Figure 12:
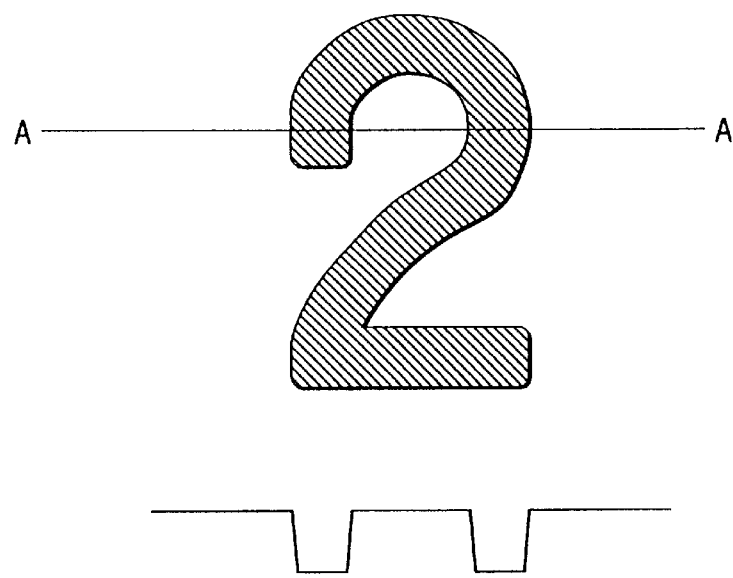

FIGS. 12(a) and 12(b) are schematic representations describing preprocessing applied when lighting unevenness affects text image data. If the character to be recognized is imaged under circumstances where lighting unevenness exists, predetermined light and dark portions are produced in the text image data of the image. Since the light and dark portions degrade the accuracy of matching processing, it is desirable to remove the effect in advance by performing preprocessing. Specifically, preprocessing is performed for the cut image between steps S22 and S23 described above.

FIG. 12(a) shows the digit "2" as an example of a cut image containing such light and dark portions. Assume that the digit "2" is gradually darker from the right to the left on the entire cut portion surrounding the digit. The brightness of the cross section taken on line A—A in such a case is shown at the corresponding position below the digit in FIG. 12(a). It is indicated that lighting unevenness is present, and the brightness decreases from the right to the left.

Then, two limiters are set in the large-brightness portion corresponding to the background portion and the small-brightness portion corresponding to the character portion in the cut range. It is desirable that the background portion limiter should be set to the minimum brightness corresponding to the background portion; in contrast, the character portion limiter should be set to the maximum brightness corresponding to the character portion. However, the setup state is excellent and may be close to the ideal setup state. At least the background portion limiter should be set to the brightness of the minimum brightness or less corresponding to the background portion. Further, the character portion limiter should be set to the brightness of the maximum brightness or more corresponding to the character portion.

In the description of the embodiment, the character portion is black, and the background portion is white. For void characters, however, the relationship between the limiters described above is substituted.

The limiters are set, and the waveform of the brightness shown in FIG. 12(a) is corrected with the background portion limiter as the upper limit value of the brightness and the character portion limiter as the lower limit value of the brightness. In this way, the image as shown in FIG. 12(b) can be provided. Thus, the effect of lighting unevenness as described above can be removed in the proximity of the edge of the character portion.

In the example in FIGS. 12(a) and 12(b), the limiters are set from the brightness graph on the cross section taken on line A—A. The setup limiters may be applied to the entire cut image described above. It is also possible to set the limiters on each cross section or its surroundings from similar brightness waveforms for a larger number of cross sections.

Figure 13:
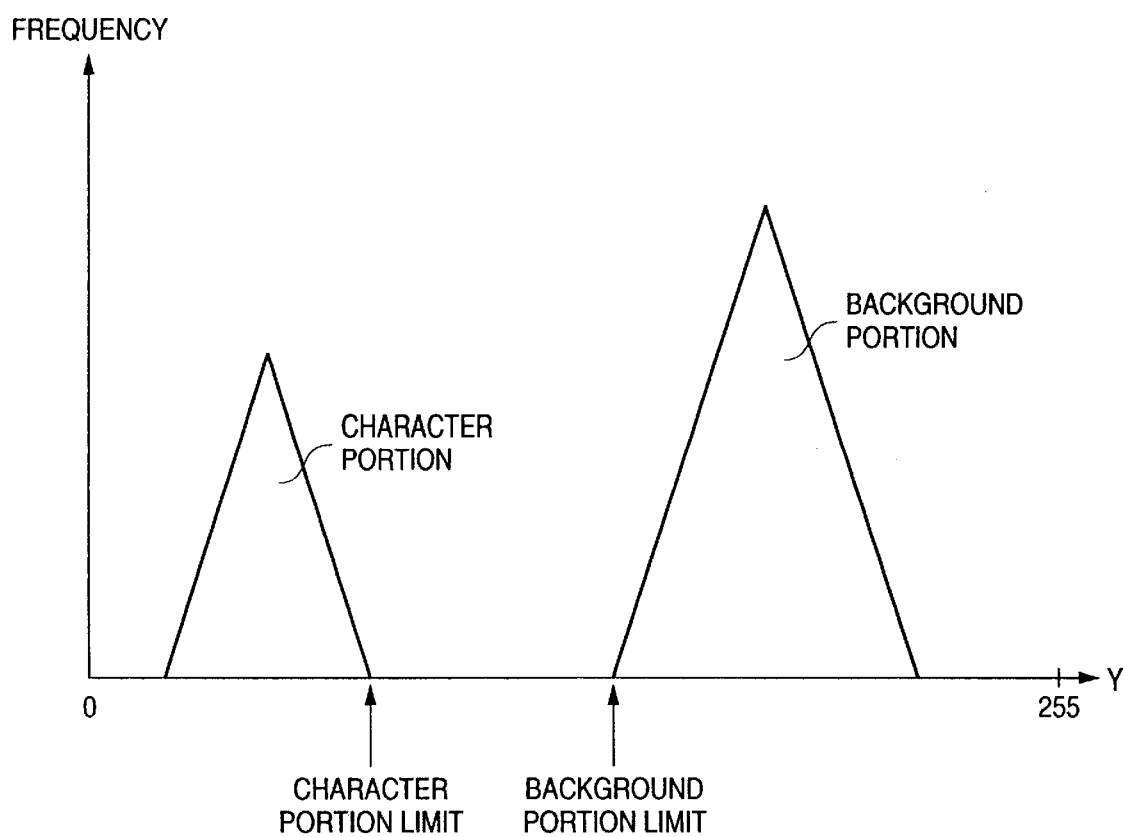
FIG. 13 is a schematic diagram describing another setting method of limiters.

FIG. 13 is a schematic diagram describing another method of setting the limiters. A brightness histogram may be used in place of setting the limiters from the brightness waveform. For example, as shown in FIG. 13, brightness histogram in a cut image is prepared. In the prepared histogram of brightness Y, for example, two large peaks made up of a character portion peak and a background portion peak appear along the direction of the brightness Y.

Then, the roots on the opposed sides (points where the frequency becomes "0") are set as the limits. In fact, however, two clear peaks with the frequency separated with "0" as shown in FIG. 13 do not result. Thus, it is also possible to set each limiter to the frequency and set the point where the frequency is reached to each brightness Y limiter. Further, in place of such frequency limiters, it is also possible to calculate the differential value of the frequency of the histogram to find the inclination angle and set the point where the inclination angle becomes a predetermined angle or more as the peak root, namely, the limiter of the brightness Y.

In the pattern matching method and the pattern matching apparatus used to execute the method according to the invention as described in detail, expansion processing is performed for a preset pattern image like dictionary data used as a matching candidate, thereby preparing a first pattern image. Contraction processing is then performed for the pattern image, thereby preparing a second pattern image. A differential image between the first and second pattern images is found, and a mask image is prepared based on the found differential image. The prepared mask image is set in an area where matching processing is not performed, whereby the edge portion that causes an erroneous determination of matching processing can be excluded from the matching processing. Therefore, pattern matching is unlikely to be affected by thin spots, bleeding, print unevenness, thinning, etc., in the pixel area in the proximity of the edge portion.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A pattern matching method comprising the steps of:

performing expansion processing for a preset pattern image used as a matching candidate so as to prepare a first pattern image;

performing contraction processing for the preset pattern image so as to prepare a second pattern image;

finding a differential image between the first and second pattern images;

preparing a mask image based on the differential image;

performing matching processing of an image containing a character to be recognized with respect to pixels in an area other than those pixels in the prepared mask image; and performing at least one step of determining an expansion processing ratio for said expansion processing based on a line width of the character to be recognized and determining a contraction processing ratio for said contraction processing based on a line width of the character to be recognized.

2. The pattern matching method as claimed in claim 1, further comprising the steps of:

extracting an edge of the image containing the character to be recognized, and weighting the matching processing based on a distance from the extracted edge.

3. The pattern matching method as claimed in claim 1, further comprising the steps of:

finding a brightness of each pixel in the image containing the character to be recognized;

setting a background limiter for limiting the brightness of a background portion; and setting a character limiter for limiting the brightness of a character portion based on the found brightness of each pixel;

forming a new image provided by limiting the brightness in the image containing the character to be recognized according to the background limiter and the character limiter; and using the new image as the character to be recognized in said step of performing matching processing.

4. The pattern matching method as claimed in claim 1, wherein said step of performing expansion processing for a preset pattern image makes an expanded preset pattern image and further performs additional expansion processing on the expanded preset pattern image when the line width of the expanded preset pattern image is narrower than a predetermined standard line width.

5. A pattern matching apparatus comprising:
first pattern image preparation means for performing expansion processing for a preset pattern image used as a matching candidate so as to prepare a first pattern image;
second pattern image preparation means for performing contraction processing for the preset pattern image so as to prepare a second pattern image;
differential image preparation means for preparing a differential image between the first and second pattern images;
mask image preparation means for preparing a mask image based on the differential image prepared by said differential image preparation means;
matching processing means for performing matching processing of an image containing a character to be recognized with respect to pixels in an area other than those pixels in the mask image prepared by the mask image preparation means; and
at least one of a means for determining an expansion processing ratio for said expansion processing based on a line width of the character to be recognized and a means for determining a contraction processing ratio for said contraction processing based on a line width of the character to be recognized.

6. The pattern matching apparatus as claimed in claim 5, further comprising:
means for extracting an edge of the image containing the character to be recognized; and
means for weighting the matching processing based on a distance from the extracted edge.

7. The pattern matching apparatus as claimed in claim 5, further comprising:
means for calculating a brightness of each pixel in the image containing the character to be recognized;
means for setting a background limiter for limiting the brightness of a background portion;
means for setting a character limiter for limiting the brightness of a character portion based on the calculated brightness of each pixel; and
means for forming a new image provided by limiting the brightness in the image containing the character to be recognized according to the background limiter and the character limiter; and
means for using the new image as the character to be recognized.

8. The pattern matching apparatus as claimed in claim 5, wherein said first pattern image preparation means for performing expansion processing for a preset pattern image makes an expanded preset pattern image and further performs additional expansion processing on the expanded preset pattern image when the line width of the expanded preset pattern image is narrower than a predetermined standard line width.

9. A pattern matching method comprising the steps of:
performing expansion processing for a preset pattern image used as a matching candidate so as to prepare a first pattern image;
using the preset pattern image as a second pattern image;
finding a differential image between the first and second pattern images;
preparing a mask image based on the differential image;
performing matching processing of an image containing a character to be recognized with respect to pixels in an area other than those pixels in the prepared mask image; and
the step of determining an expansion processing ratio for said expansion processing based on a line width of the character to be recognized.

10. The pattern matching method as claimed in claim 9, further comprising the steps of:
extracting an edge of the image containing the character to be recognized, and
weighting the matching processing based on a distance from the extracted edge.

11. The pattern matching method as claimed in claim 9, further comprising the steps of:
finding a brightness of each pixel in the image containing the character to be recognized;
setting a background limiter for limiting the brightness of a background portion; and
setting a character limiter for limiting the brightness of a character portion based on the found brightness of each pixel;
forming a new image provided by limiting the brightness in the image containing the character to be recognized according to the background limiter and the character limiter; and
using the new image as the character to be recognized in said step of performing matching processing.

12. The pattern matching method as claimed in claim 9, wherein said step of performing expansion processing for a preset pattern image makes an expanded preset pattern image and further performs additional expansion processing on the expanded image when the line width of the expanded preset pattern image is narrower than a predetermined standard line width.

13. A pattern matching apparatus comprising:
first pattern image preparation means for performing expansion processing for a preset pattern image used as a matching candidate so as to prepare a first pattern image;
second pattern image preparation means using the preset pattern image as the second pattern image;
differential image preparation means for preparing a differential image between the first and second pattern images;
mask image preparation means for preparing a mask image based on the differential image prepared by said differential image preparation means;
matching processing means for performing matching processing of an image containing a character to be recognized with respect to pixels in an area other than those pixels in the mask image prepared by the mask image preparation means; and
means for determining an expansion processing ratio for said expansion processing based on a line width of the character to be recognized.

14. The pattern matching apparatus as claimed in claim 13, further comprising:
means for extracting an edge of the image containing the character to be recognized; and means for weighting the matching processing based on a distance from the extracted edge.

15. The pattern matching apparatus as claimed in claim 13, further comprising:
   means for calculating a brightness of each pixel in the image containing the character to be recognized;
   means for setting a background limiter for limiting the brightness of a background portion;
   means for setting a character limiter for limiting the brightness of a character portion based on the calculated brightness of each pixel;
   means for forming a new image provided by limiting the brightness in the image containing the character to be recognized according to the background limiter and the character limiter; and
   means for using the new image as the character to be recognized.

16. The pattern matching apparatus as claimed in claim 13, wherein said first pattern image preparation means for performing expansion processing for a preset pattern image makes an expanded preset pattern image and further performs expansion processing on the expanded image when the line width of the expanded preset image is narrower than a predetermined standard line width.

* * * * *